(12) United States Patent
Fernandez

(10) Patent No.: US 6,512,378 B2
(45) Date of Patent: Jan. 28, 2003

(54) CABLE TESTING SYSTEMS

(76) Inventor: Javier Fernandez, P.O. Box 394, Hamlin, PA (US) 18427

( * ) Notice: Subject to any disclaimer, the term of this patent is extended or adjusted under 35 U.S.C. 154(b) by 0 days.

(21) Appl. No.: 09/841,073

(22) Filed: Apr. 25, 2001

(65) Prior Publication Data

US 2001/0033174 A1 Oct. 25, 2001

Related U.S. Application Data

(60) Provisional application No. 60/199,167, filed on Apr. 24, 2000.

(51) Int. Cl.[7] .............................................. G01R 31/02
(52) U.S. Cl. ...................................... 324/539; 324/538
(58) Field of Search ............................ 324/539, 66, 67, 324/538, 543; 379/25

(56) References Cited

U.S. PATENT DOCUMENTS

| | | | |
|---|---|---|---|
| 3,944,914 A | * 3/1976 | Simmonds ................... | 324/519 |
| 4,536,703 A | * 8/1985 | Jablway et al. .............. | 324/540 |
| 4,837,488 A | * 6/1989 | Donahue ..................... | 324/539 |
| 5,414,343 A | * 5/1995 | Flaherty et al. .............. | 324/539 |
| 5,677,633 A | * 10/1997 | Moser et al. ................ | 324/539 |
| 6,371,780 B1 | * 4/2002 | Aponte et al. ............. | 200/51.1 |

* cited by examiner

Primary Examiner—N. Le
Assistant Examiner—Vincent Q. Nguyen
(74) Attorney, Agent, or Firm—Robert A Joel, Esq.

(57) ABSTRACT

A network cable tester is connected to a multi-line test coupler, with a plurality of output cables connected in turn to a patch panel. The coupler includes an internal printed circuit board connecting the internal wire pair to an outlet jack for a maintenance free product. A terminator is also connected to the patch panel to selectively test lines by engaging wall outlets etc., with the terminator. With this system it is not necessary to connect the tester to each individual line thereby saving considerable time and expense.

3 Claims, 6 Drawing Sheets

CABLE TESTING SYSTEMS

CROSS-REFERENCE TO RELATED APPLICATIONS

This application is related to provisional application 60/199,167 filed Apr. 24, 2000.

STATEMENT REGARDING FEDERALLY SPONSORED RESEARCH OR DEVELOPMENT

Research and development is the present invention and application have not been federally sponsored, and no rights are given under any Federal program.

BACKGROUND OF THE INVENTION

1. Field of the Invention

This invention relates to multi-line CAT V cable pairing testing and particularly to a tester connected multi-line test coupler which is connected to a patch panel having a plurality of lines which are tested by a network cable terminator. This system avoids the necessity of connecting each line individually to the cable terminator.

2. Description of the Related Art Including Information Disclosed Uner 37 CFR §§1.97–1.98

In the prior art, it was necessary to connect and test lines individually with a network cable terminator. This procedure took considerable time and effort as the technician had to connect and reconnect lines before applying the cable terminator for continuity test purposes.

The prior art relates to test devices and couplers. The present invention discloses a multi-line cable tester, which includes a multi-line coupler, which is connected to a plurality of cable pairs through a patch panel for testing purposes. A cable terminator is applied to the pairs at their outlet to rapidly test the pairs.

The concept of using a network work cable terminator is old and such devices are commercially available. Connectors of various types are also available but applicant is proposing a new multi-line test coupler, which operates in conjunction with a network terminator to provide unique advantages including a savings in time and the expense of testing and production.

SUMMARY OF THE INVENTION

Applicant discloses a multi-unit network cable tester, which is connected to a coupling device via a four pair cable. The coupling device includes a plurality of internal terminals wherein individual coded wires from the cable are connected to an outlet jack. In a preferred embodiment, the coupling device includes a printed circuit board to connect the internal wire pairs to a jack to provide an maintenance free product. The cable from the tester unit includes a plug connector which engages a mating receptacle in the coupling device.

The outlet from the coupling device comprises a plurality of cable pairs which have an RJ45 terminal at the end of each cable for connection to a patch panel where a cable terminator can be used to test the lines. The cable terminator is connected to the patch panel for testing purposes. An additional RJ45 terminal may be mounted adjacent the first RJ45 terminal and coupled thereto. This permits testing of twice as many lines.

The concepts of this invention may also be used in connection with a CAT V or CAT VI application as well as with minor modification on certain voice applications.

Accordingly, an object of this invention is to provide a new and improved method and apparatus to test cable lines.

Another object of this invention is to provide a new and improved testing device, which includes a coupling device to permit rapid testing of various cable lines.

A further object of this invention is to provide a new and improved coupling device, which includes an internal printed circuit board, coupled to one or more input RJ45 cable connectors from a multi-line tester and to a plurality of outlet cables, which are coupled to the wires being tested.

A more specific object of this invention is to provide a new and improved cable testing system including a multi-network cable tester which is connected to a coupling device having a printed circuit board connected to a plurality of incoming cables which are connected at their other end to a patch panel which goes to various cable outlets to which a cable terminator is applied without the need to continuously reconnect the tester.

BRIEF DESCRIPTION OF THE DRAWINGS

The above and other objects and advantages of this invention may be more clearly seen when viewed in conjunction with the accompanying drawings wherein:

FIG. 4a shows a side view of the coupling device for category V cable while

DETAILED DESCRIPTION OF THE INVENTION

Figure 1:
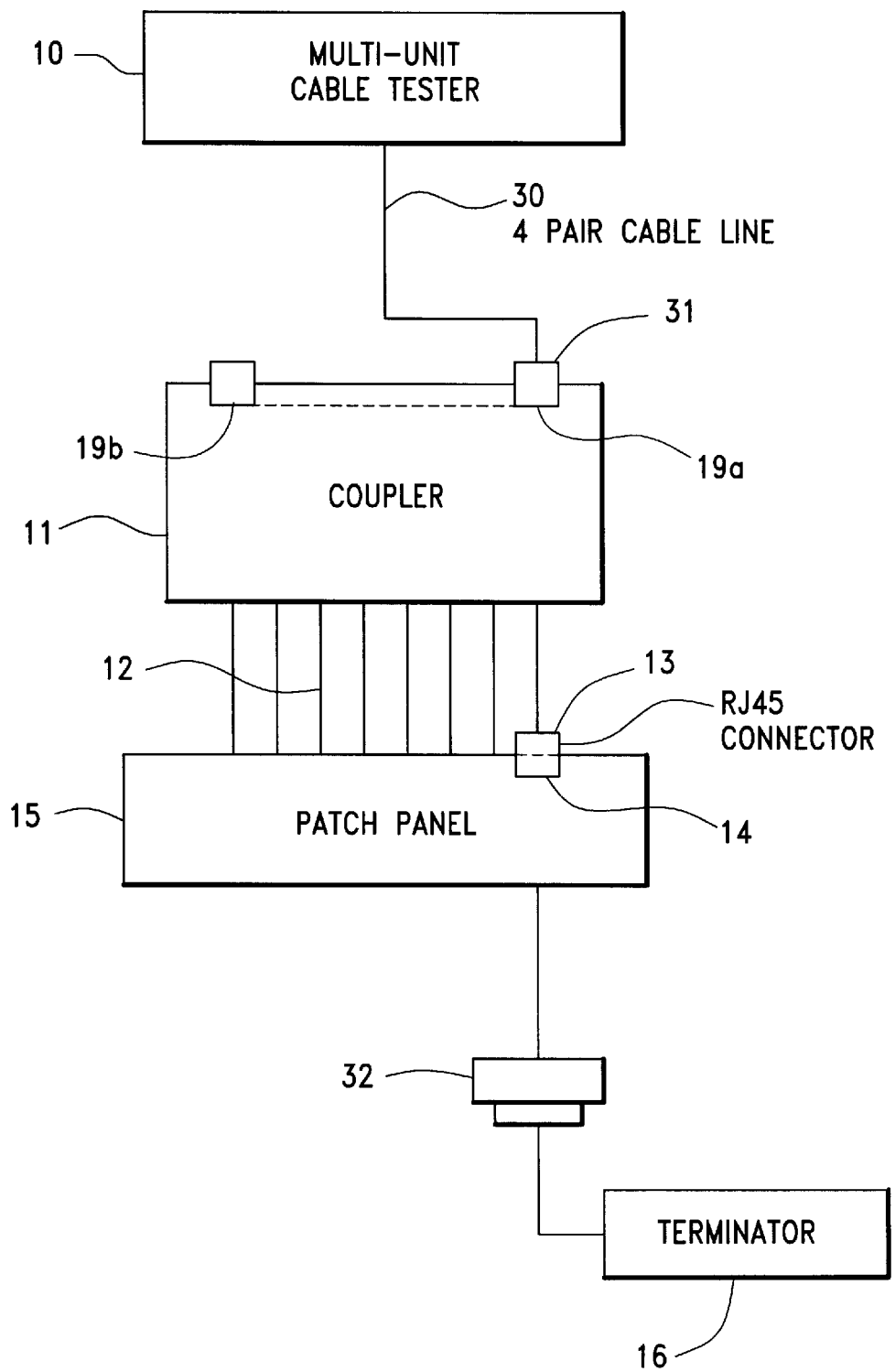
FIG. 1 is a schematic view of the testing system showing the various elements thereof.

Referring now to the drawings, the invention comprises a multi-network cable tester 10 which is connected to a coupling device 11 through a four pair cable line 30 having a jack 31 at one end to engage receptacles 19a, 19b. The coupling device 11 includes a plurality of output cables 12. Each of the cables 12 includes an RJ45 connector 13 at one end, which connects to a jack 14 in a patch panel 15. A network cable terminator 16 is connected to the patch panel 15 to test various cables 12 for continuity. This arrangement is shown in FIG. 1.

With the foregoing arrangement, it is possible to test a plurality of lines 12 with a network terminator 16 by merely connecting the terminator 16 to an outlet 32 which terminates on the patch panel 15 rather than each individual cable 12 resulting in considerable savings in time and effort. Ordinarily, an operator would has to connect and disconnect the tester 10 to check different cable wires 12.

Figure 2A:
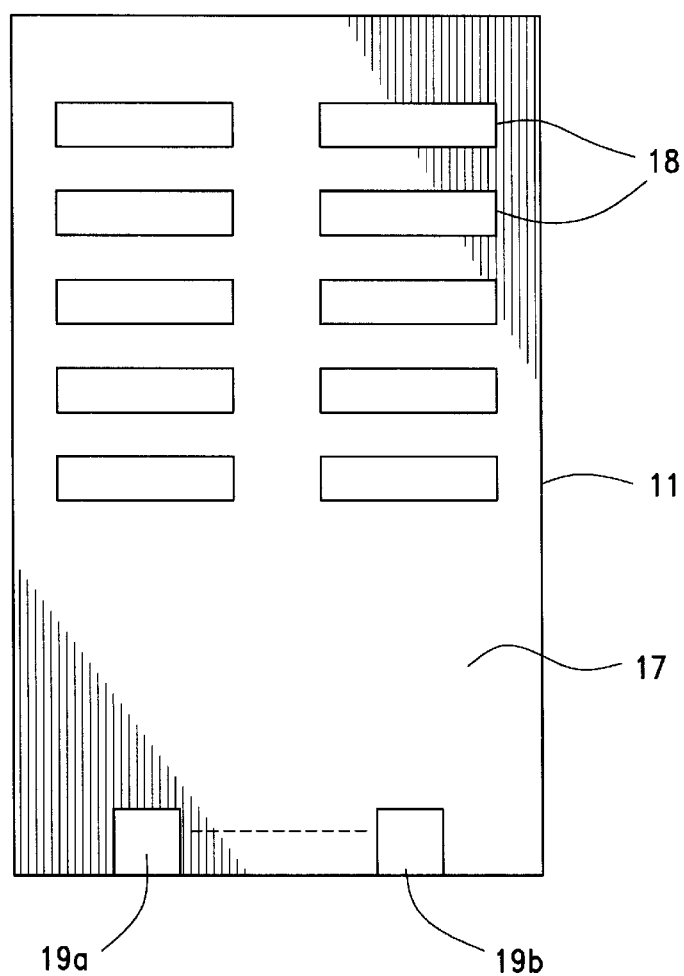
FIG. 2a is a plan view of the coupling device with FIG. 2b showing a front view of the RJ45 connectors and FIG. 2c showing the connection of the cable wires on the array of terminals.
Figure 2B:
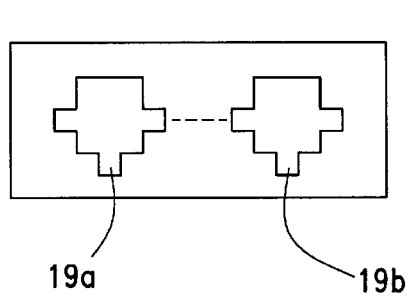
Figure 2C:
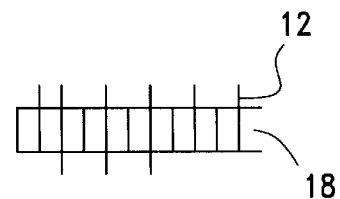

FIG. 2a shows a plan view of the coupling device 11, in one embodiment, with an internal printed circuit board 17 and a plurality of 110 type terminals 18 connected to the board 17. The individual cable wires 12 are grouped on each terminal 18 as shown in FIG. 2c with the color-coded wires 12 being affixed with a coupling tool (not shown). A typical 110-type termination block 18 is shown in FIG. 2c with the wire colors indicated thereon in the actual unit. The terminals 18 are lined up in two parallel arrays with a pair of RJ45 jack receptacles 19a, 19b at one end of the coupler. The jacks 19a, 19b are connected to each other and to the terminals 18 so that twice the number of lines can be tested with one hookup. A test signal would go from the jacks 19a, 19b to a designated terminal 18 to test the cable wire associated therewith.

Figure 3A:
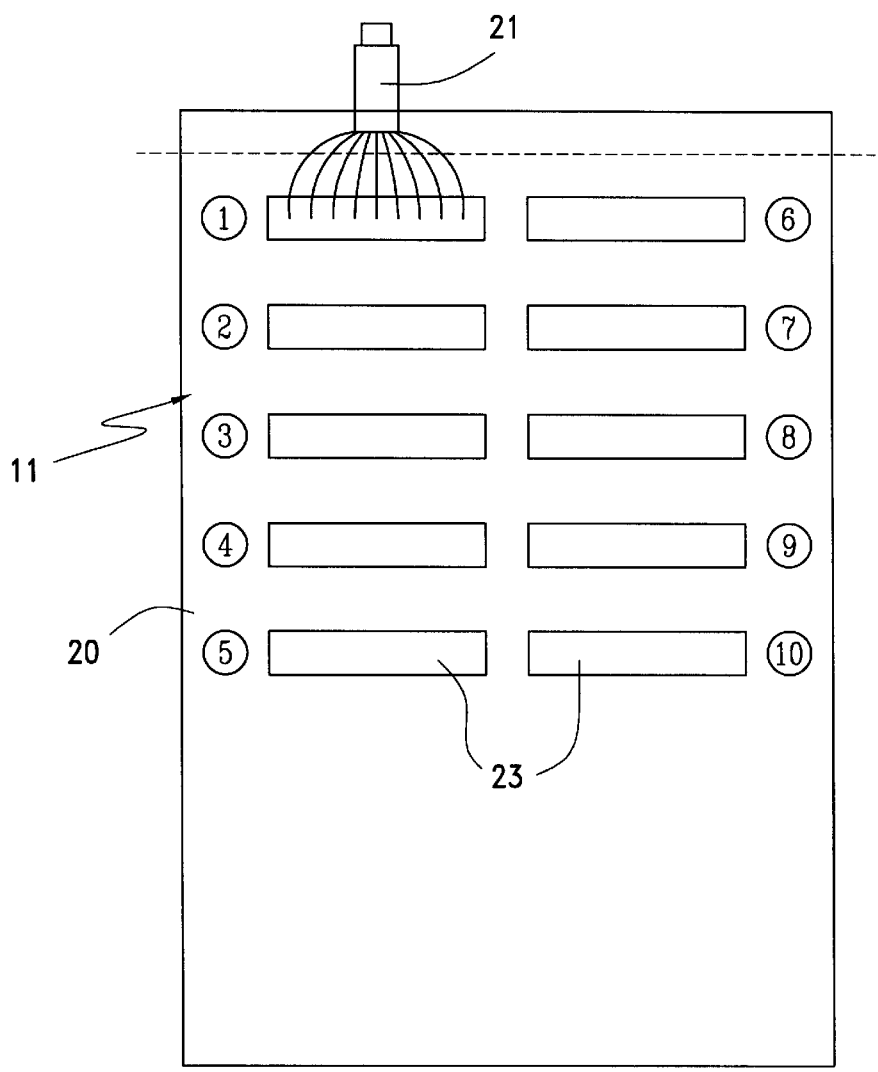
FIG. 3a is a plan view of the coupling device with FIG. 3b showing a rear view.
Figure 3B:
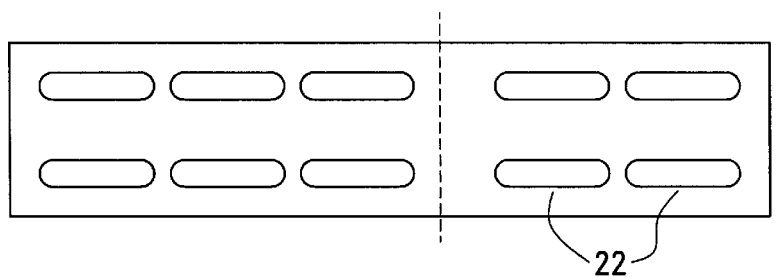
FIG. 3c showing the circuit for a standard 110-type termination.
FIG. 3d shows an RJ 45 connection on the circuit board.
Figure 3C:
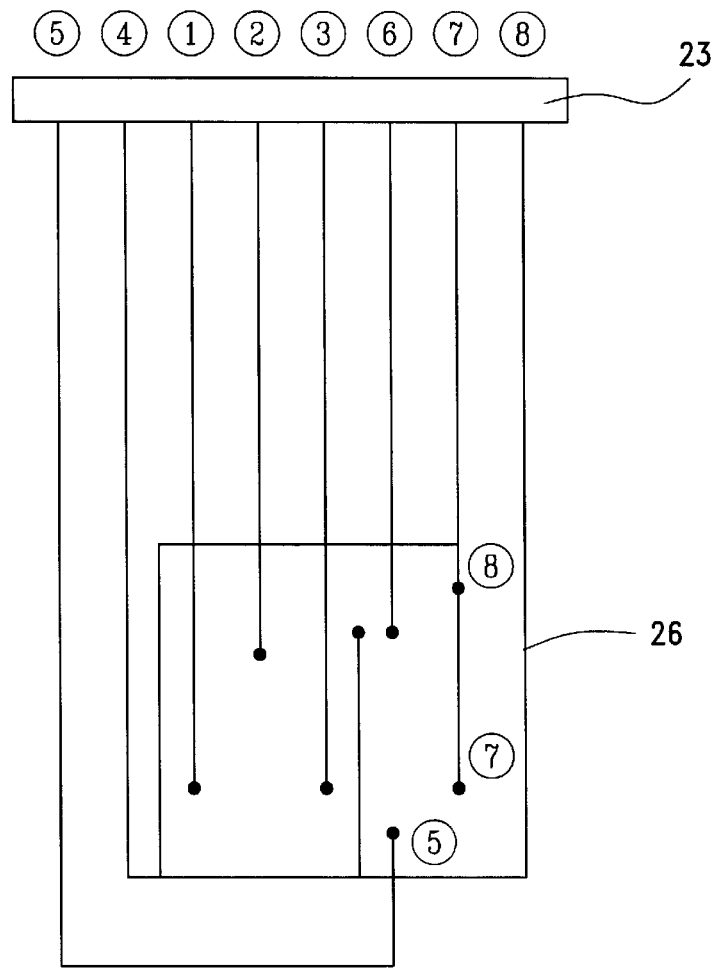
Figure 3D:
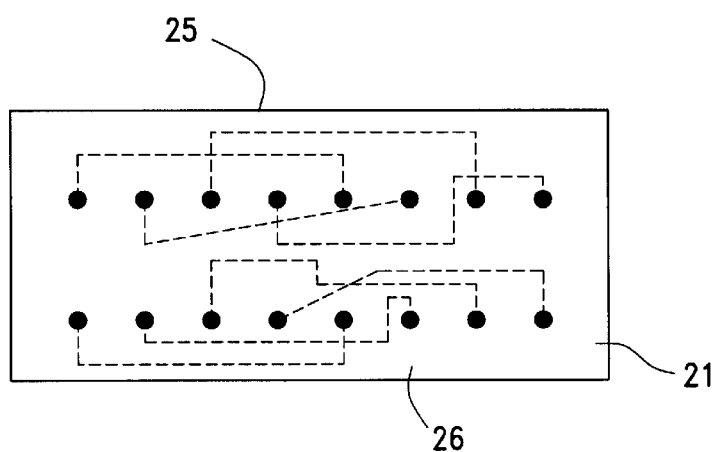

FIG. 3a depicts the test coupler 11 with board 20 connected to a category V or VI cable 21. A plurality of apertures 22 are located at one end of the test coupler 11 to receive the cables 12, which are connected to the various terminal blocks 23. FIG. 3c illustrates the connection of the 110-type termination 23 to an RJ45 coupling 21. FIG. 3d shows the RJ45 connection 21 on a circuit board 25.

Figure 4A:
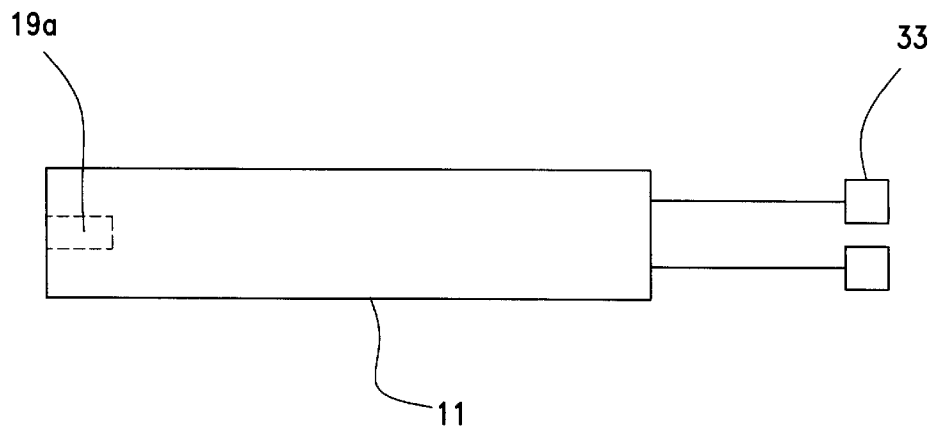
Figure 4B:
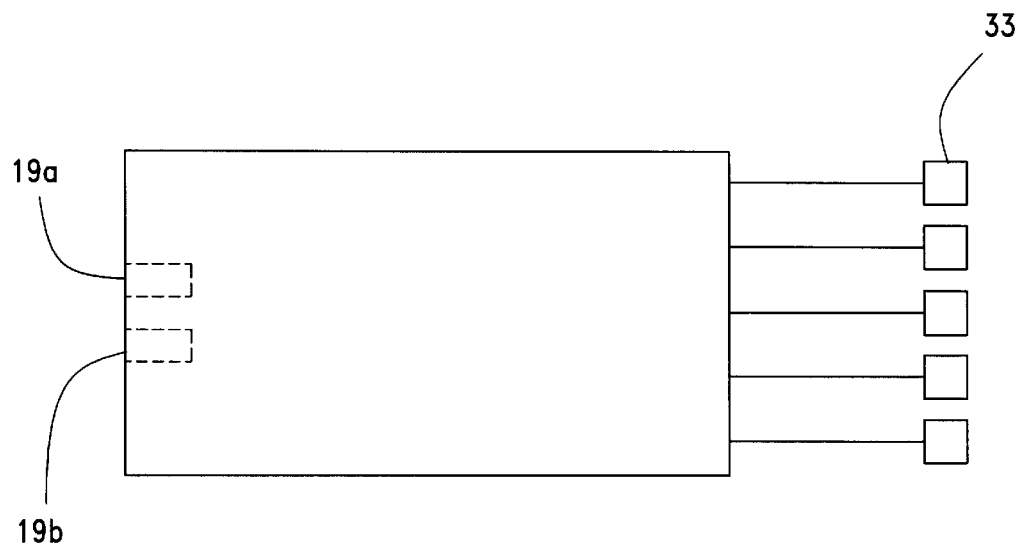
FIG. 4b shows a top view of the coupling device for a category VI cable; and, FIG. 5a is a plan view of a preferred embodiment showing the arrangement of inlet and outlet jacks mounted on a printed circuit board with FIG. 5b representing an end view showing a dual series of six outlet jacks mounted on the board.

FIG. 4a shows a side view of the coupler 11 with the RJ45 jacks 19a, 19b at one end and various category V cables 12 extending outwardly from the other end terminating in RJ45 plugs 33. In the view of FIG. 4b, five lines are shown with five lines directly below not shown for a total of ten lines.

Figure 5A:
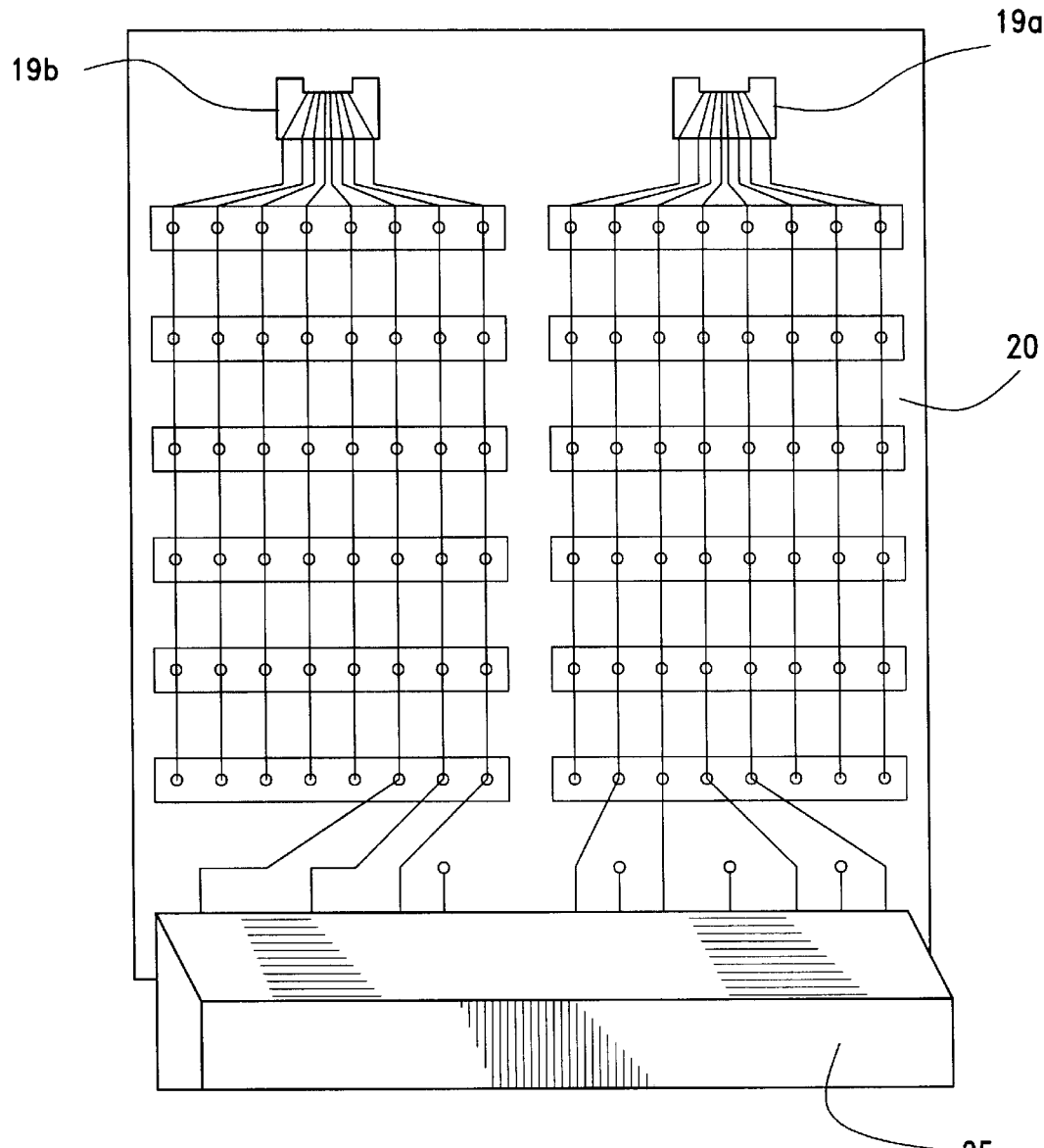
Figure 5B:
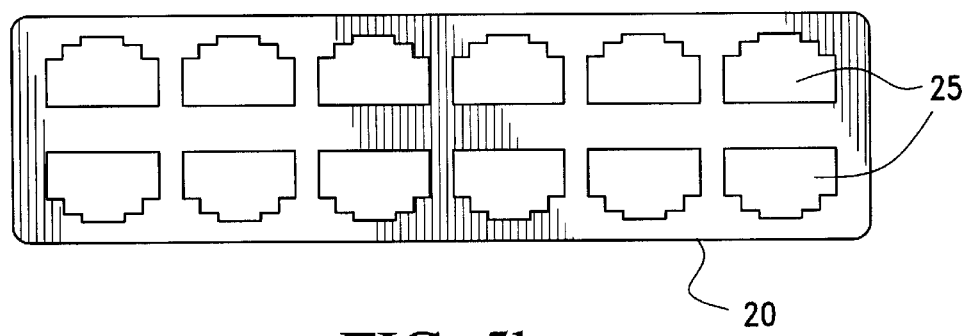

Preferably, a circuit board 17 is used in the coupler 11 since it essentially provides a maintenance free product. Each line can be replaced or omitted if it goes bad with no impact on the unit 11 or its function. This embodiment is shown in FIGS. 5a and 5b with the outlet jacks 25 being mounted in a series of six jacks 25 on top of a second series of six jacks. A second circuit board 20 may be mounted to the first board or the rear surface of the illustrated board 20 may be used for coupling the second series of jacks 25. This increases the capacity of the unit 11. The unit 11 can operate effectively without the defective line. The line can be replaced later.

The 110 termination 18 is employed for production and assembly purposes. The assembly time is reduced considerably with the 110-type termination 18.

In the category V and VI applications, the only modifications are as follows; an enhanced CAT VI cable must be used along with enhanced RJ45 plug, jack and circuit board.

Thus, with the invention, it is possible to test ten lines in rapid succession or simultaneously with two terminators 16. An operator plugs the terminator 16 into a wall plate or other outlet and moves the terminator 16 rapidly from one line to the next. There is no need to go back and reconnect the tester 10. After the connected lines have been tested, the coupler is moved to a second series of lines. This procedure is especially efficient in offices with hundreds of lines and there the lines terminate at distances or on other floors. It also eliminates the need for additional expensive testers 10. The coupler may also include lights to identify lines being listed and may be used with a ring out to test continuity.

While the invention has been explained by a detailed description of certain specific embodiments, it is understood that various modifications and substitutions can be made in any of them within the scope of the appended claims, which are intended also to include equivalents of such embodiments.

What is claimed is:

1. A multi-unit network cable tester for rapidly testing a plurality of lines comprises:

a multi-unit tester having a four pair outlet cable including a jack at one end of the cable;

a coupling device including one or more input jacks, a plurality of input cables to be tested connected to the coupling device and having a jack mounted on at least one end of said cable;

a patch panel having a plurality of jacks to connect with jacks on said cables;

a cable terminator connected to the patch panel to test the plurality of input cables connected to the coupling device without connecting and disconnecting the tester to the individual cables and, wherein the coupling device comprises a printed circuit board having a plurality of jacks mounted at one end to connect to the cables to be tested.

2. A multi-unit network cable tester for rapidly testing a plurality of lines in accordance with claim 1 wherein:

a multi-unit tester having a four pair outlet cable including a jack at one end of the cable;

a coupling device including one or more input jacks, a plurality of input cables to be tested connected to the coupling device and having a jack mounted on at least one end of said cable;

a patch panel having a plurality of jacks to connect with jacks on said cables;

a cable terminator connected to the patch panel to test the plurality input cables connected to the coupling device without connecting and disconnecting the tester to the individual cables and wherein the coupling device comprises a printed circuit board having a plurality of jacks mounted at one end to connect to the cables to be tested and, wherein the printed circuit board comprises a plurality of 110 connectors mounted thereon, said connectors having individual cable wires mounted on each connector in a predetermined layout.

3. A multi-unit network cable tester for rapidly testing a plurality of lines comprises:

a multi-unit tester having a four pair outlet cable including a jack at one end of the cable;

a coupling device including at least one input jacks, a plurality of input cables to be tested connected to the coupling device and having a jack mounted on at least one end of said cable;

a cable terminator connected to test the plurality input cables connected to the coupling device without connecting and disconnecting the tester to the individual cables and wherein the coupling device comprises a printed circuit board having a plurality of jacks mounted at one end to connect to the cables to be tested.

\* \* \* \* \*